(12) United States Patent
Kojima

(10) Patent No.: US 10,336,890 B2
(45) Date of Patent: Jul. 2, 2019

(54) RUBBER COMPOSITION FOR STUDLESS WINTER TIRES, AND STUDLESS WINTER TIRE

(71) Applicant: SUMITOMO RUBBER INDUSTRIES, LTD., Kobe-shi, Hyogo (JP)

(72) Inventor: Ryoji Kojima, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 0 days.

(21) Appl. No.: 15/120,224

(22) PCT Filed: Feb. 18, 2015

(86) PCT No.: PCT/JP2015/054359
§ 371 (c)(1),
(2) Date: Aug. 19, 2016

(87) PCT Pub. No.: WO2015/141360
PCT Pub. Date: Sep. 24, 2015

(65) Prior Publication Data
US 2017/0066909 A1 Mar. 9, 2017

(30) Foreign Application Priority Data
Mar. 17, 2014 (JP) .................................. 2014-053731

(51) Int. Cl.
C08L 9/00 (2006.01)
C08K 7/02 (2006.01)
B60C 1/00 (2006.01)
C08L 7/00 (2006.01)
B60C 11/14 (2006.01)

(52) U.S. Cl.
CPC .............. *C08L 9/00* (2013.01); *B60C 1/0016* (2013.01); *C08K 7/02* (2013.01); *C08L 7/00* (2013.01); *B60C 2011/145* (2013.01); *C08K 2201/003* (2013.01); *C08K 2201/011* (2013.01); *C08L 2205/03* (2013.01); *C08L 2205/16* (2013.01)

(58) Field of Classification Search
CPC ......... B60C 1/00; B60C 11/14; B60C 1/0016; B60C 2011/145; C08L 1/02; C08L 21/00; C08L 1/12; C08L 7/00; C08L 9/00; C08L 2205/16; C08L 2205/03; C08K 7/02; C08K 2201/011; C08K 2201/003
See application file for complete search history.

(56) References Cited

U.S. PATENT DOCUMENTS

| | | |
|---|---|---|
| 2,140,527 A | 12/1938 | Haynes et al. |
| 2,486,720 A | 11/1949 | Perkerson |
| 2,650,891 A | 9/1953 | Buckwalter |
| 2,905,567 A | 9/1959 | Allen |
| 3,709,845 A | 1/1973 | Boustany et al. |
| 3,716,513 A | 2/1973 | Burke, Jr. |
| 3,959,194 A | 5/1976 | Adelmann |
| 4,508,860 A | 4/1985 | Hawes |
| 4,835,216 A | 5/1989 | Morikawa et al. |
| 5,000,092 A | 3/1991 | Best |
| 5,017,636 A | 5/1991 | Hattori et al. |
| 5,290,830 A | 3/1994 | Tung et al. |
| 5,396,940 A | 3/1995 | Segatta et al. |
| 5,569,740 A | 10/1996 | Tanaka et al. |
| 5,908,893 A | 6/1999 | Kawasaki et al. |
| 5,967,211 A | 10/1999 | Lucas et al. |
| 6,117,545 A | 9/2000 | Cavaille et al. |
| 6,306,955 B1 | 10/2001 | Kawasaki et al. |
| 6,376,587 B1 | 4/2002 | Ajiro et al. |
| 6,489,389 B1 | 12/2002 | Ohta et al. |
| 6,550,508 B1 * | 4/2003 | Yamaguchi ............. B60C 11/00 152/167 |
| 6,703,497 B1 | 3/2004 | Ladouce et al. |
| 7,427,646 B2 | 9/2008 | Kondou |
| 8,022,136 B2 | 9/2011 | Yano et al. |

(Continued)

FOREIGN PATENT DOCUMENTS

| | | |
|---|---|---|
| CN | 1572825 A | 2/2005 |
| CN | 1692128 A | 11/2005 |

(Continued)

OTHER PUBLICATIONS

International Search Report, issued in PCT/JP2015/054359, PCT/ISA/210, dated Apr. 7, 2015.

(Continued)

*Primary Examiner* — Alexander C Kollias
(74) *Attorney, Agent, or Firm* — Birch, Stewart, Kolasch & Birch LLP

(57) ABSTRACT

Provided by the present invention are a rubber composition for studless winter tires capable of improving performance on snow and ice while maintaining good abrasion resistance, and a studless winter tire including the rubber composition. The present invention relates to a rubber composition for studless winter tires containing a rubber component and bionanofibers, the bionanofibers having an average fiber diameter of 0.1 μm or less, the rubber component having a combined amount of natural rubber and polybutadiene rubber of 30% to 100% by mass based on 100% by mass of the rubber component, the rubber composition containing the bionanofibers in an amount of 1 to 10 parts by mass relative to 100 parts by mass of the rubber component.

2 Claims, No Drawings

(56) References Cited

U.S. PATENT DOCUMENTS

| | | |
|---|---|---|
| 8,163,821 B2 | 4/2012 | Hiro |
| 8,273,804 B2 | 9/2012 | Nishimura |
| 8,623,956 B2 | 1/2014 | Sugimoto et al. |
| 8,633,275 B2 | 1/2014 | Sakaki et al. |
| 8,658,728 B2 | 2/2014 | Ichikawa et al. |
| 8,658,730 B2 | 2/2014 | Ichikawa |
| 8,809,450 B2 | 8/2014 | Sakaki et al. |
| 8,813,798 B2 | 8/2014 | Tsumori et al. |
| 8,857,482 B2 | 10/2014 | Taguchi et al. |
| 8,875,765 B2 | 11/2014 | Tsumori et al. |
| 9,217,075 B2 * | 12/2015 | Fujikura ............ B60C 1/0016 |
| 2002/0128369 A1 * | 9/2002 | Wideman ............ B60C 1/0016 524/493 |
| 2003/0060551 A1 | 3/2003 | Mizuno et al. |
| 2003/0083516 A1 | 5/2003 | Korth et al. |
| 2004/0110889 A1 | 6/2004 | Yagi et al. |
| 2004/0266937 A1 | 12/2004 | Yagi et al. |
| 2005/0027060 A1 | 2/2005 | Yagi et al. |
| 2005/0148723 A1 | 7/2005 | Kondou |
| 2005/0234186 A1 | 10/2005 | Kondou |
| 2006/0252879 A1 | 11/2006 | Tanaka et al. |
| 2007/0059232 A1 | 3/2007 | Stenzel et al. |
| 2007/0100061 A1 | 5/2007 | Hattori et al. |
| 2007/0197688 A1 | 8/2007 | Tsukada et al. |
| 2007/0231532 A1 * | 10/2007 | Walters ............ B32B 25/10 428/97 |
| 2007/0241480 A1 | 10/2007 | Kanenari et al. |
| 2008/0009570 A1 | 1/2008 | Miyazaki |
| 2008/0185087 A1 | 8/2008 | Galimberti et al. |
| 2009/0000721 A1 | 1/2009 | Imoto et al. |
| 2009/0088496 A1 | 4/2009 | Miyasaka et al. |
| 2009/0099281 A1 | 4/2009 | Sakurai et al. |
| 2010/0076118 A1 * | 3/2010 | Yano ............ B60C 1/00 523/351 |
| 2010/0206444 A1 | 8/2010 | Kawasaki |
| 2010/0252159 A1 * | 10/2010 | Mukai ............ B60C 11/0302 152/209.25 |
| 2010/0294407 A1 | 11/2010 | Kushida |
| 2011/0094648 A1 | 4/2011 | Horiguchi |
| 2011/0094649 A1 | 4/2011 | Miyazaki |
| 2011/0136939 A1 | 6/2011 | Lechtenboehmer et al. |
| 2011/0166254 A1 | 7/2011 | Nishimura |
| 2011/0172339 A1 | 7/2011 | Satou |
| 2011/0178235 A1 | 7/2011 | Sugimoto |
| 2011/0184118 A1 | 7/2011 | Sugimoto et al. |
| 2011/0230613 A1 | 9/2011 | Hiro |
| 2011/0253285 A1 | 10/2011 | Ichikawa et al. |
| 2011/0294949 A1 | 12/2011 | Sakaki et al. |
| 2012/0214911 A1 | 8/2012 | Yano et al. |
| 2013/0030083 A1 | 1/2013 | Taguchi et al. |
| 2013/0066021 A1 | 3/2013 | Ichikawa et al. |
| 2013/0098523 A1 | 4/2013 | Tsumori et al. |
| 2013/0102722 A1 | 4/2013 | Tsumori et al. |
| 2013/0123387 A1 | 5/2013 | Kagawa et al. |
| 2013/0184373 A1 | 7/2013 | Miyazaki et al. |
| 2013/0190426 A1 * | 7/2013 | Fujikura ............ B60C 1/0016 524/9 |
| 2013/0197131 A1 * | 8/2013 | Fujikura ............ B60C 1/0016 524/9 |
| 2013/0197132 A1 * | 8/2013 | Fujikura ............ B60C 1/0016 524/35 |
| 2016/0032086 A1 | 2/2016 | Takaoka et al. |
| 2016/0272792 A1 * | 9/2016 | Miyazaki ............ C08L 1/02 |

FOREIGN PATENT DOCUMENTS

| | | |
|---|---|---|
| CN | 1832967 A | 9/2006 |
| CN | 1946744 A | 4/2007 |
| CN | 101270219 A | 9/2008 |
| CN | 101856954 A | 10/2010 |
| CN | 102245644 A | 11/2011 |
| CS | 237729 B1 | 10/1985 |
| EP | 0328261 A1 | 8/1989 |
| EP | 0905186 A1 | 3/1999 |
| EP | 1484359 A1 | 12/2004 |
| EP | 1568713 A1 | 8/2005 |
| EP | 1650253 A1 | 4/2006 |
| EP | 1652862 A1 | 5/2006 |
| EP | 1816144 A1 | 8/2007 |
| EP | 2072574 A1 | 6/2009 |
| EP | 2154192 A1 | 2/2010 |
| EP | 2223928 A1 | 9/2010 |
| EP | 2284022 A1 | 2/2011 |
| EP | 2333008 A1 | 6/2011 |
| EP | 2333009 A1 | 6/2011 |
| EP | 2366558 A1 | 9/2011 |
| EP | 2377892 A1 | 10/2011 |
| EP | 2476708 A1 | 7/2012 |
| EP | 2615127 A2 | 7/2013 |
| GB | 164392 A | 6/1921 |
| GB | 240939 A | 10/1925 |
| JP | 4-38209 A | 2/1992 |
| JP | 4-356205 A | 12/1992 |
| JP | 5-301994 A | 11/1993 |
| JP | 6-87306 A | 3/1994 |
| JP | 6-329702 A | 11/1994 |
| JP | 6-329838 A | 11/1994 |
| JP | 7-149955 A | 6/1995 |
| JP | 7-196850 A | 8/1995 |
| JP | 8-12814 A | 1/1996 |
| JP | 8-143606 A | 6/1996 |
| JP | 11-12306 A | 1/1999 |
| JP | 11-78437 A | 3/1999 |
| JP | 11-129711 A | 5/1999 |
| JP | 11-222012 A | 8/1999 |
| JP | 11-513425 A | 11/1999 |
| JP | 2000-95898 A | 4/2000 |
| JP | 2000-344955 A | 12/2000 |
| JP | 2001-114939 A | 4/2001 |
| JP | 2002-503621 A | 2/2002 |
| JP | 2002-155164 A | 5/2002 |
| JP | 3294901 B2 | 6/2002 |
| JP | 2002-524618 A | 8/2002 |
| JP | 2002-338734 A | 11/2002 |
| JP | 2003-64221 A | 3/2003 |
| JP | 2003-94918 A | 4/2003 |
| JP | 2003-320804 A | 11/2003 |
| JP | 2004-59803 A | 2/2004 |
| JP | 2004-67027 A | 3/2004 |
| JP | 2004-91715 A | 3/2004 |
| JP | 2004-182905 A | 7/2004 |
| JP | 2004-250546 A | 9/2004 |
| JP | 2004-262973 A | 9/2004 |
| JP | 2004-359773 A | 12/2004 |
| JP | 2005-41960 A | 2/2005 |
| JP | 2005-68240 A | 3/2005 |
| JP | 2005-75856 A | 3/2005 |
| JP | 2005-82622 A | 3/2005 |
| JP | 2005-82766 A | 3/2005 |
| JP | 2005-126604 A | 5/2005 |
| JP | 2005-133025 A | 5/2005 |
| JP | 2005-325206 A | 11/2005 |
| JP | 2005-325307 A | 11/2005 |
| JP | 2006-16622 A | 1/2006 |
| JP | 2006-36926 A | 2/2006 |
| JP | 2006-96926 A | 4/2006 |
| JP | 2006-104455 A | 4/2006 |
| JP | 2006-152045 A | 6/2006 |
| JP | 2006-152171 A | 6/2006 |
| JP | 2006-152211 A | 6/2006 |
| JP | 2006-206837 A | 8/2006 |
| JP | 2006-206864 A | 8/2006 |
| JP | 2006-281744 A | 10/2006 |
| JP | 2006-307018 A | 11/2006 |
| JP | 2007-131730 A | 5/2007 |
| JP | 2007-145898 A | 6/2007 |
| JP | 2007-169431 A | 7/2007 |
| JP | 2008-106099 A | 5/2008 |
| JP | 2008-156446 A | 7/2008 |
| JP | 2008-214608 A | 9/2008 |
| JP | 2008-308615 A | 12/2008 |
| JP | 2009-1680 A | 1/2009 |
| JP | 2009-13196 A | 1/2009 |

(56) References Cited

FOREIGN PATENT DOCUMENTS

| | | | |
|---|---|---|---|
| JP | 2009-13197 A | 1/2009 |
| JP | 2009-51955 A | 3/2009 |
| JP | 2009-67929 A | 4/2009 |
| JP | 2009-84564 A | 4/2009 |
| JP | 2009-91482 A | 4/2009 |
| JP | 2009-108308 A | 5/2009 |
| JP | 2009-191132 A | 8/2009 |
| JP | 2009-191198 A | 8/2009 |
| JP | 2009-202865 A | 9/2009 |
| JP | 2009-262835 A | 11/2009 |
| JP | 2010-70747 A | 4/2010 |
| JP | 2010-111785 A | 5/2010 |
| JP | 2010-138359 A | 6/2010 |
| JP | 2010-144001 A | 7/2010 |
| JP | 2010-173513 A | 8/2010 |
| JP | 2010-174169 A | 8/2010 |
| JP | 2010-242023 A | 10/2010 |
| JP | 2010-248282 A | 11/2010 |
| JP | 4581116 B2 | 11/2010 |
| JP | 2010-275642 A | 12/2010 |
| JP | 2011-63651 A | 3/2011 |
| JP | 2011-153221 A | 8/2011 |
| JP | 2011-153222 A | 8/2011 |
| JP | 2011-157473 A | 8/2011 |
| JP | 2011-225680 A | 11/2011 |
| JP | 2011-231214 A | 11/2011 |
| JP | 2011-256311 A | 12/2011 |
| JP | 2012-1571 A | 1/2012 |
| JP | 2012-122019 A | 6/2012 |
| JP | 2013-204010 A | 10/2013 |
| WO | WO 03/082925 A1 | 10/2003 |
| WO | WO 2005/012365 A1 | 2/2005 |
| WO | WO 2005/092971 A1 | 10/2005 |
| WO | WO 2009/096113 A1 | 8/2009 |
| WO | WO 2010/071106 A1 | 6/2010 |
| WO | WO 2011/049162 A1 | 4/2011 |
| WO | WO 2011/096393 A1 | 8/2011 |
| WO | WO 2011/096399 A1 | 8/2011 |
| WO | WO 2013/081138 A1 | 6/2013 |
| WO | WO 2014/142319 A1 | 9/2014 |

OTHER PUBLICATIONS

Written Opinion of the International Searching Authority, issued in PCT/JP2015/054359, PCT/ISA/237, dated Apr. 7, 2015.
Full Machine Translation of JP 2005-133025 A dated May 26, 2005.
Full Machine Translation of JP 2012-122019 A dated Jun. 28, 2012.
Full Machine Translation of JP 4-38209 A dated Feb. 7, 1992.
"Shinpan Kobunshi Jiten" (Polymer Dictionary, New Edition), 6th Imp., published Mar. 20, 2001, p. 448, with partial translation of lines 21-30 of the left column of p. 448 (3 pages total).
Database WPI Week 200570, Thomson Scientific, London, GB; AN 2005-684076, XP-002673748, Apr. 18, 2012, 2 pages.
Extended European Search Report, dated Aug. 27, 2010, for European Application No. 08830800.2.
Food Chemicals Codex (7th Edition). The United States Pharmacopeial Convention. Calcium Lignosulfonate. Online version available at: http://app.knovel.com/hotlink/toc/id:kpFCCE0002/food-chemicals-codex/food-chemicals-codex, 2010, p. 142.
International Search Report (Form PCT/ISA/210) for International Application No. PCT/JP2009/070824, dated Mar. 9, 2010.
International Search Report (Form PCT/ISA/210) for International Application No. PCT/JP2011/063248, dated Sep. 13, 2011.
Japanese Office Action for Japanese Application No. 2008-318710, dated Mar. 9, 2010.
Japanese Office Action for Japanese Application No. 2008-318711, dated Mar. 9, 2010.
Japanese Office Action for Japanese Application No. 2009-019711, dated Mar. 9, 2010.
Rhodia, "Rhodia Silcea launches Zeosil® Premium, a new generation of high surface-area silica offering lower resistance and greater performance," Rhodia Silica News Release, Solvay-Rhodia, Lyon, France, Feb. 27, 2007, 3 pages.
The Chemical Society of Japan, "Hyojun Kagaku Yoga Jiten" (Standard Dictionary of Chemical Terms), 2nd Ed., published Mar. 31, 2005, pp. 672-673, with partial translation of lines 5-9 of the left column of p. 673 (3 pages total).
Tokai Carbon Co., Ltd., "SEAST SO (FEF)", Physicochemical Properties, Product Information, retrieved Feb. 20, 2014, 3 pages, http://www.tokaicarbon.co.jp/en/products/carbon_b/seast/.

* cited by examiner

RUBBER COMPOSITION FOR STUDLESS WINTER TIRES, AND STUDLESS WINTER TIRE

TECHNICAL FIELD

The present invention relates to a rubber composition for studless winter tires, and a studless winter tire including the rubber composition.

BACKGROUND ART

Studded tires or snow chains on tires were used for driving on snowy and icy roads; however, they unfortunately cause environmental problems, such as dust pollution. Studless winter tires were therefore developed as alternative tires for driving on snowy and icy roads. Since studless winter tires are for use on snowy roads with rougher surfaces than normal roads, the materials and structure thereof are specially designed. For example, a rubber composition that contains a diene rubber having excellent low-temperature properties, and a rubber composition that contains a large amount of a softener to enhance the softening effect have been developed (for example, Patent Literature 1).

Some approaches have been tested to improve performance on snow and ice of studless winter tires, for example, by increasing the amount of polybutadiene rubber in a rubber composition. However, the increase in the amount of polybutadiene rubber is limited because too much an amount of polybutadiene rubber leads to excessively high mobility in the rubber, thereby causing blooming of various agents. Also, when a larger amount of polybutadiene rubber is incorporated, the proportion of natural rubber in the rubber composition decreases along with the increase in the amount of polybutadiene rubber. Consequently, the resulting rubber unfortunately has insufficient strength and poor abrasion resistance.

Another known approach to improve performance on snow and ice of studless winter tires is to incorporate glass fibers as a scratching material into a rubber composition. Unfortunately, this method may also lead to a reduction in abrasion resistance, and is therefore considered to be insufficient for improving performance on snow and ice of studless winter tires.

CITATION LIST

Patent Literature

Patent Literature 1: JP 2009-091482 A

SUMMARY OF INVENTION

Technical Problem

The present invention has been made in view of the above circumstances, and aims to provide a rubber composition for studless winter tires capable of improving performance on snow and ice while maintaining good abrasion resistance, and a studless winter tire including the rubber composition.

Solution to Problem

The present invention relates to a rubber composition for studless winter tires, containing a rubber component and bionanofibers, the bionanofibers having an average fiber diameter of 0.1 μm or less, the rubber component having a combined amount of natural rubber and polybutadiene rubber of 30% to 100% by mass based on 100% by mass of the rubber component, the rubber composition containing the bionanofibers in an amount of 1 to 10 parts by mass relative to 100 parts by mass of the rubber component.

The present invention also relates to a studless winter tire, including a cap tread formed from the above-described rubber composition for studless winter tires.

Advantageous Effects of Invention

The rubber composition for studless winter tires of the present invention contains a rubber component with a predetermined combined amount of natural rubber and polybutadiene rubber, and a predetermined amount of bionanofibers having a predetermined average fiber diameter. The use of such a rubber composition allows for providing a studless winter tire having improved performance on snow and ice (grip performance on snow and ice) while maintaining good abrasion resistance.

DESCRIPTION OF EMBODIMENTS

The rubber composition for studless winter tires of the present invention contains a rubber component with a predetermined combined amount of natural rubber and polybutadiene rubber, and a predetermined amount of bionanofibers having an average fiber diameter of 0.1 μm or less. The incorporation of the bionanofibers having such a very small average fiber diameter as 0.1 μm or less in the rubber composition enables formation of nano-scale water channels on tire surfaces, which improves performance on snow and ice (grip performance on snow and ice) while maintaining good abrasion resistance. Furthermore, according to the present invention, natural rubber and/or polybutadiene rubber, which have excellent low-temperature properties, are incorporated together with the bionanofibers, thereby synergistically improving performance on snow and ice.

In the present invention, the combined amount of natural rubber (NR) and polybutadiene rubber (BR) based on 100% by mass of the rubber component is 30% to 100% by mass. In the present invention, it is sufficient to incorporate either NR or BR. In order to more suitably achieve the effects of the present invention, preferably BR is incorporated, more preferably both NR and BR are incorporated. The lower limit of the combined amount is preferably 60% by mass or more, more preferably 80% by mass or more.

Examples of NR include commonly used NRs, such as TSR20 or RSS#3.

In order to better achieve the effects of the present invention, the amount of NR based on 100% by mass of the rubber component is preferably 30% by mass or more, more preferably 40% by mass or more, but preferably 85% by mass or less, more preferably 75% by mass or less, still more preferably 70% by mass or less, particularly preferably 60% by mass or less.

Non-limiting examples of BR include: high-cis BRs, such as BR730 and BR51 both available from JSR Corporation, BR1220 available from Zeon Corporation, and BR130B, BR150B and BR710 all available from Ube Industries, Ltd.; and low-cis BRs, such as BR1250H available from Zeon Corporation. Each of these BRs may be used alone, or two or more types thereof may be used in combination.

The BR preferably has a cis content of 80% by mass or more, more preferably 85% by mass or more, still more preferably 90% by mass or more, particularly preferably 95% by mass or more. With such a cis content, better performance on snow and ice can be obtained.

The cis content values herein are determined by infrared absorption spectrum analysis.

In order to better achieve the effects of the present invention, the amount of BR based on 100% by mass of the rubber component is preferably 10% by mass or more, more preferably 20% by mass or more, still more preferably 30% by mass or more, particularly preferably 40% by mass or more. The amount is also preferably 70% by mass or less, more preferably 60% by mass or less. When the amount of BR is more than 70% by mass, the performance on snow and ice (grip performance on snow and ice) may be poor, though good abrasion resistance can be obtained.

Examples of materials that can be used as the rubber component other than the NR and BR include polyisoprene rubber (IR), styrene-butadiene copolymer rubber (SBR), butadiene-isoprene copolymer rubber, and butyl rubber.

Bionanofibers usable in the present invention are not particularly limited but cellulose microfibrils are preferred because of their good reinforcing properties leading to more suitable achievement of the effects of the present invention. Preferable examples of the cellulose microfibrils include those derived from naturally-occurring materials, such as woods, bamboo, hemp, jute, kenaf, crop waste, fabric, recycled pulp, waste paper, bacterial cellulose, or ascidian cellulose.

The bionanofibers may be produced by any method, for example, by chemically treating the raw materials of cellulose microfibrils with sodium hydroxide or other agents, and mechanically grinding or beating the treated materials using a refiner, a twin-screw kneader (twin-screw extruder), a twin-screw kneading extruder, a high-pressure homogenizer, a media agitating mill, a stone mill, a grinder, a vibration mill, a sand grinder, or other machines. In this method, since lignin is separated from the raw materials by the chemical treatment, substantially lignin-free bionanofibers can be produced.

The bionanofibers have an average fiber diameter of 0.1 µm or less. The use of the bionanofibers having such a very small average fiber diameter enables formation of nanoscale water channels on tire surfaces, which improves performance on snow and ice (grip performance on snow and ice) while maintaining good abrasion resistance. In contrast, when bionanofibers having an average fiber diameter of more than 0.1 µm are used, the tires may have greatly reduced abrasion resistance and, further, the water channels on the tire surfaces may be wider and deeper and thereby fail to remove a thin water film on ice, possibly resulting in greatly reduced performance on snow and ice. The bionanofibers preferably have an average fiber diameter of 0.05 µm or less, more preferably 0.03 µm or less. The lower limit of the average fiber diameter of the bionanofibers is not particularly limited but is preferably 4 nm or more because when such bionanofibers are entangled, they are less likely to be separated from each other and thus less likely to be dispersed.

The bionanofibers preferably have an average fiber length of 5 mm or less, more preferably 1 mm or less, but preferably 1 µm or more, more preferably 50 µm or more. Bionanofibers having an average fiber length of less than the lower limit or more than the upper limit show the same tendencies as described for the average fiber diameter.

The average fiber diameter and average fiber length of the bionanofibers can be measured by, for example, image analysis of scanning electron micrographs, image analysis of transmission micrographs, X-ray scattering data analysis, or aperture impedance method (Coulter principle).

The amount of the bionanofibers relative to 100 parts by mass of the rubber component is 1 part by mass or more, preferably 1.5 parts by mass or more, more preferably 2 parts by mass or more. The amount is also 10 parts by mass or less, preferably 9 parts by mass or less, more preferably 8 parts by mass, still more preferably 7 parts by mass or less. When the amount is less than 1 part by mass, the effects of the present invention may not be sufficiently exerted, while when the amount is more than 10 parts by mass, the tires may have poor abrasion resistance, and may have greatly increased hardness so that contrary to expectations, the performance on snow and ice can be reduced.

The rubber composition of the present invention preferably contains carbon black. The incorporation of carbon black provides a reinforcing effect, so that the effects of the present invention can be better achieved.

The carbon black preferably has a nitrogen adsorption specific surface area ($N_2SA$) of 50 $m^2/g$ or more, more preferably 90 $m^2/g$ or more. Carbon black having a $N_2SA$ of less than 50 $m^2/g$ may fail to provide sufficient reinforcing properties, possibly resulting in insufficient abrasion resistance or performance on snow and ice. The $N_2SA$ is preferably 180 $m^2/g$ or less, more preferably 130 $m^2/g$ or less. Carbon black having a $N_2SA$ of more than 180 $m^2/g$ tends to be difficult to disperse, and thus tends to deteriorate abrasion resistance.

The $N_2SA$ of carbon black is determined in accordance with JIS K 6217-2:2001.

The carbon black preferably has a dibutyl phthalate oil absorption (DBP) of 50 mL/100 g or more, more preferably 100 mL/100 g or more. Carbon black having a DBP of less than 50 mL/100 g may fail to provide sufficient reinforcing properties, possibly resulting in insufficient abrasion resistance or performance on snow and ice. The DBP of carbon black is also preferably 200 mL/100 g or less, more preferably 135 mL/100 g or less. Carbon black having a DBP of more than 200 mL/100 g may reduce processability or abrasion resistance.

The DBP of carbon black is determined in accordance with JIS K 6217-4:2001.

The amount of carbon black relative to 100 parts by mass of the rubber component is preferably 10 parts by mass or more, more preferably 20 parts by mass or more. The use of less than 10 parts by mass of carbon black may not provide sufficient reinforcing properties, possibly resulting in insufficient abrasion resistance or performance on snow and ice. The amount of carbon black is preferably 80 parts by mass or less, more preferably 60 parts by mass or less, still more preferably 40 parts by mass or less. The use of more than 80 parts by mass of carbon black tends to result in poor dispersibility and therefore poor abrasion resistance.

The rubber composition of the present invention preferably contains silica. The incorporation of silica provides a reinforcing effect, so that the effects of the present invention can be better achieved. Examples of silica include dry silica (anhydrous silica) and wet silica (hydrous silica). Wet silica is preferred among these because it contains a large number of silanol groups.

The silica preferably has a nitrogen adsorption specific surface area ($N_2SA$) of 40 $m^2/g$ or more, more preferably 70 $m^2/g$ or more, still more preferably 110 $m^2/g$ or more. Silica having a $N_2SA$ of less than 40 $m^2/g$ may fail to provide sufficient reinforcing properties, possibly resulting in insufficient abrasion resistance or performance on snow and ice. The $N_2SA$ of silica is also preferably 220 $m^2/g$ or less, more preferably 200 m²/g or less. Silica having a N₂SA of more than 220 m²/g may be difficult to disperse and thus may deteriorate abrasion resistance.

The N₂SA values of silica are determined by the BET method in accordance with ASTM D3037-93.

The amount of silica relative to 100 parts by mass of the rubber component is preferably 10 parts by mass or more, more preferably 20 parts by mass or more. The use of less than 10 parts by mass of silica may not provide sufficient reinforcing properties, possibly resulting in insufficient abrasion resistance or performance on snow and ice. The amount of silica is preferably 80 parts by mass or less, more preferably 60 parts by mass or less, still more preferably 40 parts by mass or less. The use of more than 80 parts by mass of silica tends to lead to poor dispersibility and therefore poor abrasion resistance.

In the case where the rubber composition of the present invention contains silica, it preferably contains a silane coupling agent in combination with the silica.

Any silane coupling agent conventionally used in combination with silica in the rubber industry can be used. Examples include sulfide silane coupling agents such as bis(3-triethoxysilylpropyl)disulfide, mercapto silane coupling agents such as 3-mercaptopropyltrimethoxysilane, vinyl silane coupling agents such as vinyltriethoxysilane, amino silane coupling agents such as 3-aminopropyltriethoxysilane, glycidoxy silane coupling agents such as γ-glycidoxypropyltriethoxysilane, nitro silane coupling agents such as 3-nitropropyltrimethoxysilane, and chloro silane coupling agents such as 3-chloropropyltrimethoxysilane. Preferred among these are sulfide silane coupling agents, with bis(3-triethoxysilylpropyl)disulfide being more preferred.

The amount of silane coupling agent relative to 100 parts by mass of silica is preferably 1 part by mass or more, more preferably 3 parts by mass or more. The use of less than 1 part by mass of a silane coupling agent may not provide sufficient reinforcing properties, possibly resulting in insufficient abrasion resistance or performance on snow and ice. The amount of silane coupling agent is also preferably 15 parts by mass or less, more preferably 10 parts by mass or less. The use of more than 15 parts by mass of a silane coupling agent tends not to produce an effect proportional to the increase in the cost.

The rubber composition of the present invention preferably contains oil. The incorporation of oil reduces the hardness of the rubber, resulting in better performance on snow and ice.

The oil may be, for example, a process oil, vegetable fat and oil, or a mixture thereof. Examples of the process oils include paraffinic process oils, naphthenic process oils, and aromatic process oils (aromatic oils). Examples of the vegetable fats and oils include castor oil, cotton seed oil, linseed oil, rapeseed oil, soybean oil, palm oil, coconut oil, peanut oil, rosin, pine oil, pine tar, tall oil, corn oil, rice oil, safflower oil, sesame oil, olive oil, sunflower oil, palm kernel oil, camellia oil, jojoba oil, macadamia nut oil, and tung oil.

The amount of oil relative to 100 parts by mass of the rubber component is preferably 5 parts by mass or more, more preferably 10 parts by mass or more, still more preferably 20 parts by mass or more. When the amount is less than 5 parts by mass, sufficient performance on snow and ice may not be obtained. The amount of oil is also preferably 80 parts by mass or less, more preferably 60 parts by mass or less, still more preferably 50 parts by mass or less. When the amount is more than 80 parts by mass, abrasion resistance may deteriorate.

The rubber composition of the present invention may appropriately incorporate compounding agents generally used in the tire industry, in addition to the above components. Examples of such compounding agents include wax, stearic acid, zinc oxide, antioxidants, vulcanizing agents such as sulfur, vulcanization accelerators, and other materials.

Examples of vulcanization accelerators include sulfenamide, thiazole, thiuram, thiourea, guanidine, dithiocarbamate, aldehyde-amine or aldehyde-ammonia imidazoline, and xanthate vulcanization accelerators. Each of these vulcanization accelerators may be used alone, or two or more types thereof may be used in combination. Sulfenamide vulcanization accelerators are preferred among these because then the effects of the present invention can be more suitably achieved. More preferred are combinations of sulfenamide vulcanization accelerators and guanidine vulcanization accelerators such as diphenylguanidine.

Examples of sulfenamide vulcanization accelerators include N-tert-butyl-2-benzothiazolylsulfenamide (TBBS), N-cyclohexyl-2-benzothiazolylsulfenamide (CBS), and N,N-dicyclohexyl-2-benzothiazolylsulfenamide (DCBS). CBS is preferred among these because then the effects of the present invention can be more suitably achieved. More preferred are combinations of CBS with guanidine vulcanization accelerators such as diphenylguanidine.

The rubber composition of the present invention can be prepared by usual methods. Specifically, for example, the above components may be kneaded with a Banbury mixer, a kneader, an open roll mill or other devices, and then vulcanized to prepare a rubber composition.

The rubber composition of the present invention can be suitably used in various components of studless winter tires, and especially in treads (cap tread). Thus, another aspect of the present invention is a studless winter tire including a cap tread formed from the rubber composition for studless winter tires of the present invention.

The studless winter tire of the present invention can be manufactured by usual methods using the rubber composition described above. Specifically, an unvulcanized rubber composition incorporating the rubber component and the bionanofibers, and optionally the above-described various compounding agents is extruded and processed into the shape of, for example, a tread, and then assembled with other tire components on a tire building machine by a usual method to build an unvulcanized tire. The unvulcanized tire is heated under pressure in a vulcanizer, whereby a studless winter tire of the present invention can be obtained.

The studless winter tire of the present invention can be suitably used for passenger vehicles.

EXAMPLES

The present invention is now specifically described referring to examples but is not limited to these examples.

The chemicals used in examples and comparative examples are listed below.

Natural rubber: RSS#3
Polybutadiene rubber: BR1220 (cis content: 96% by mass) available from Zeon Corporation
Carbon black: Seast N220 (N₂SA: 114 m²/g, DBP: 114 mL/100 g) available from Mitsubishi Chemical Corporation
Silica: Ultrasil VN3 (N₂SA: 175 m²/g, average primary particle size: 15 nm) available from Evonik Degussa Silane coupling agent: Si75 (bis(3-triethoxysilyl-propyl)disulfide) available from Evonik Degussa Bionanofibers: Celish KY-100G (average fiber length: 0.5 mm, average fiber diameter: 0.02 µm, solid content: 10% by mass) available from Daicel FineChem Ltd.

Oil: Process X-140 available from JX Nippon Oil & Energy Corporation

Wax: Sunnoc N available from Ouchi Shinko Chemical Industrial Co., Ltd.

Zinc oxide: Zinc oxide #1 available from Mitsui Mining and Smelting Co., Ltd.

Stearic acid: stearic acid "Tsubaki" available from NOF Corporation

Antioxidant: Antigene 6C (N-(1,3-dimethylbutyl)-N'-phenyl-p-phenylenediamine) available from Sumitomo Chemical Co., Ltd.

Sulfur: powdered sulfur available from Karuizawa Sulfur

Vulcanization accelerator 1: Nocceler CZ (N-cyclohexyl-2-benzothiazolylsulfenamide) available from Ouchi Shinko Chemical Industrial Co., Ltd.

Vulcanization accelerator 2: Nocceler D (N,N'-diphenylguanidine) available from Ouchi Shinko Chemical Industrial Co., Ltd.

Examples and Comparative Examples

The materials in the formulation amounts shown in Table 1, excluding the sulfur and the vulcanization accelerators, were kneaded using a 1.7-L Banbury mixer (available from Kobe Steel, Ltd.) at about 150° C. for 5 minutes to provide a kneaded mixture (depending on the formulation, the oil was introduced in two portions in the kneading). Then, the sulfur and vulcanization accelerators in the formulation amounts shown in Table 1 were added to the kneaded mixture, and they were kneaded using an open roll mill, at about 80° C. for 3 minutes, thereby providing an unvulcanized rubber composition. The unvulcanized rubber composition was formed into a tread and assembled with other tire components on a tire building machine to build an unvulcanized tire. The unvulcanized tire was vulcanized at 170° C. for 15 minutes to prepare a test tire (size: 195/65R15).

The test tires prepared as above were evaluated by the following tests. Table 1 shows the results.

(Hardness [Hs])

The hardness of the rubber composition cut out of the tread of the test tire was measured using a type-A durometer at −10° C. in accordance with JIS K 6253. The hardness values are expressed as an index, with Comparative Example 1 set equal to 100. A higher index indicates a higher hardness.

(Surface Observation)

The test tires were mounted on a front-engine, front-wheel-drive car made in Japan. After the car was driven 200 km on a dry asphalt road, a rubber composition sample was taken from the tread of the test tires, and the surface of the rubber was observed with a TEM. The percentage of water channels (B) was calculated using the equation below, where A is the area (µm$^2$) of water channels within a 100 µm×100 µm visual field.

$$B(\%)=(A/10,000)\times 100$$

A larger value indicates a greater number of water channels.

(Performance on Snow and Ice)

The test tires were mounted on a 2000-cc front-engine, rear-wheel-drive car made in Japan. The car was driven on snow and ice under the conditions described below to evaluate the performance on snow and ice. Specifically, in the evaluation of performance on snow and ice, the car was driven on ice or snow, and the brakes that lock up were applied at 30 km/h. Then, the stopping distance (brake stopping distance on ice or snow), which was the distance required for the car to stop after the braking, was measured and expressed as an index calculated according to the equation below. A higher index indicates better grip performance on snow and ice.

(Braking performance index)=(Brake stopping distance in Comparative Example 1)/(Brake stopping distance of each formulation)×100

|  | (on ice) | (on snow) |
|---|---|---|
| Test place: | Test track in Nayoro, Hokkaido | Test track in Nayoro, Hokkaido |
| Temperature: | −6° C. to −1° C. | −10° C. to −2° C. |

(Abrasion Resistance)

The test tires were mounted on a front-engine, front-wheel-drive car made in Japan, and the depth of the grooves on the tire tread part was measured after the car had run 8000 km. A running distance that decreased the depth of the tire grooves by 1 mm was calculated and expressed as an index calculated according to the equation below. A higher index indicates better abrasion resistance. Indexes of 95 or higher are rated good.

(Abrasion resistance index)=(Running distance that decreased groove depth by 1 mm)/(Running distance that decreased tire groove depth by 1 mm in Comparative Example 1)×100

TABLE 1

| | | Comparative Example 1 | Example 1 | Example 2 | Example 3 | Example 4 | Comparative Example 2 | Comparative Example 3 | Comparative Example 4 |
|---|---|---|---|---|---|---|---|---|---|
| Formulation (parts by mass) | Natural rubber | 50 | 50 | 50 | 50 | 50 | 50 | 50 | 50 |
| | Polybutadiene rubber | 50 | 50 | 50 | 50 | 50 | 50 | 50 | 50 |
| | Carbon black | 30 | 30 | 30 | 30 | 30 | 30 | 30 | 30 |
| | Silica | 30 | 30 | 30 | 30 | 30 | 30 | 30 | 30 |
| | Silane coupling agent | 2 | 2 | 2 | 2 | 2 | 2 | 2 | 2 |
| | Bionanofibers | — | 1 | 3 | 5 | 7 | 0.5 | 15 | 30 |
| | Oil | 40 | 40 | 40 | 40 | 40 | 40 | 40 | 40 |
| | Wax | 2 | 2 | 2 | 2 | 2 | 2 | 2 | 2 |
| | Zinc oxide | 2 | 2 | 2 | 2 | 2 | 2 | 2 | 2 |
| | Stearic acid | 2 | 2 | 2 | 2 | 2 | 2 | 2 | 2 |
| | Antioxidant | 2 | 2 | 2 | 2 | 2 | 2 | 2 | 2 |

TABLE 1-continued

|  |  | Comparative Example 1 | Example 1 | Example 2 | Example 3 | Example 4 | Comparative Example 2 | Comparative Example 3 | Comparative Example 4 |
|---|---|---|---|---|---|---|---|---|---|
|  | Sulfur | 1.5 | 1.5 | 1.5 | 1.5 | 1.5 | 1.5 | 1.5 | 1.5 |
|  | Vulcanization accelerator 1 | 2 | 2 | 2 | 2 | 2 | 2 | 2 | 2 |
|  | Vulcanization accelerator 2 | 2 | 2 | 2 | 2 | 2 | 2 | 2 | 2 |
|  | Total | 215.5 | 216.5 | 218.5 | 220.5 | 222.5 | 216 | 230.5 | 245.5 |
| Evaluation | Hs (−10° C.) | 100 | 101 | 102 | 103 | 104 | 100 | 120 | 140 |
|  | Percentage of water channels (%) | 0 | 10 | 25 | 35 | 50 | 3 | 55 | 60 |
|  | Performance on snow and ice | 100 | 106 | 110 | 115 | 118 | 100 | 105 | 95 |
|  | Abrasion resistance | 100 | 100 | 99 | 98 | 96 | 100 | 88 | 65 |

Table 1 demonstrates that the tires of the examples containing a rubber component with a predetermined combined amount of natural rubber and polybutadiene rubber, and a predetermined amount of bionanofibers having a predetermined average fiber diameter achieved improved performance on snow and ice (grip performance on ice and snow) while maintaining good abrasion resistance.

The invention claimed is:

1. A studless winter tire, comprising:
a cap tread formed from a rubber composition comprising
a rubber component,
bionanofibers,
carbon black and
silica,
the bionanofibers having an average fiber diameter of 4 nm to 20 nm,
the bionanofibers being cellulose microfibrils,
the rubber component having a combined amount of natural rubber and polybutadiene rubber of 60% to 100% by mass based on 100% by mass of the rubber component, an amount of the natural rubber of 30 to 70% by mass based on 100% by mass of the rubber component and an amount of the polybutadiene rubber of 30 to 70% by mass based on 100% by mass of the rubber component,
the rubber composition comprising the bionanofibers in an amount of 1 to 10 parts by mass relative to 100 parts by mass of the rubber component, the carbon black in an amount of 10 to 60 parts by mass relative to 100 parts by mass of the rubber component and the silica in an amount of 10 to 60 parts by mass relative to 100 parts by mass of the rubber component.

2. The studless winter tire of claim 1, wherein the rubber component has a combined amount of natural rubber and polybutadiene rubber of 80% to 100% by mass based on 100% by mass of the rubber component.

* * * * *